Figure 1:
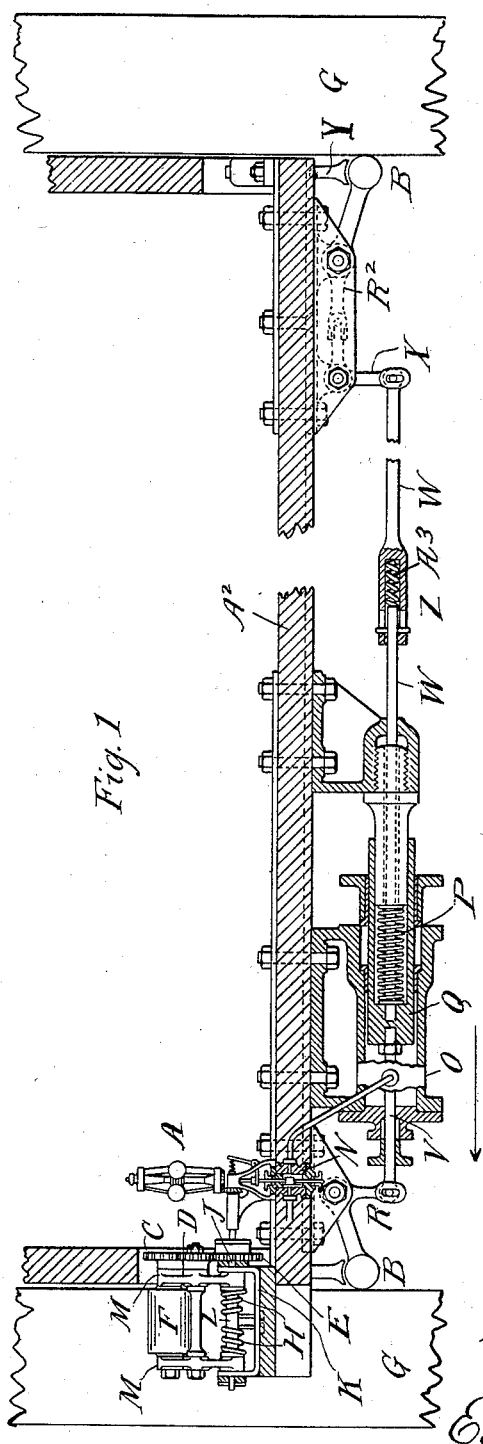

No. 717,240. Patented Dec. 30, 1902.
W. G. MENZIES.
SAFETY BRAKE FOR ELEVATOR CARS OR LIFTS.
(Application filed May 17, 1902.)
(No Model.) 2 Sheets—Sheet 1.

WITNESSES:
INVENTOR
William G. Menzies
BY
Edgar Tate & Co
ATTORNEYS

No. 717,240. Patented Dec. 30. 1902.
W. G. MENZIES.
SAFETY BRAKE FOR ELEVATOR CARS OR LIFTS.
(Application filed May 17, 1902.)
(No Model.) 2 Sheets—Sheet 2.
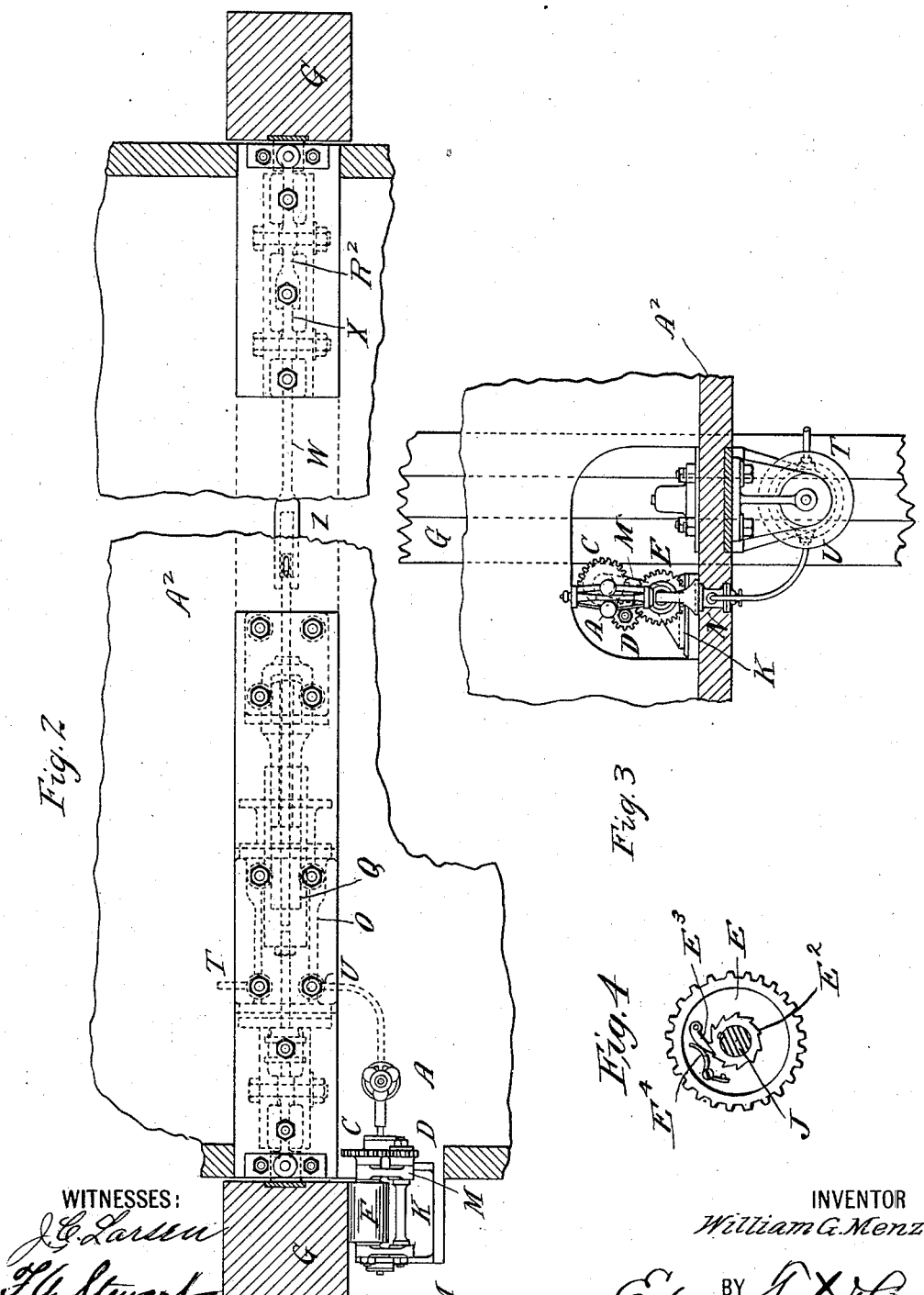
WITNESSES:
J. C. Larsen
F. H. Stewart
INVENTOR
William G. Menzies
BY Edgar Tate & Co
ATTORNEYS

UNITED STATES PATENT OFFICE.

WILLIAM GRAHAM MENZIES, OF PLUMSTEAD, ENGLAND.

SAFETY-BRAKE FOR ELEVATOR CARS OR LIFTS.

SPECIFICATION forming part of Letters Patent No. 717,240, dated December 30, 1902.

Application filed May 17, 1902. Serial No. 107,710. (No model.)

*To all whom it may concern:*

Be it known that I, WILLIAM GRAHAM MENZIES, a subject of the King of Great Britain, residing at Plumstead, England, have invented certain new and useful Improvements in Safety-Brakes for Elevator Cars or Lifts, of which the following is a full and complete specification, such as will enable those skilled in the art to which it appertains to make and use the same.

The object of this invention is to provide an improved safety-brake for use in connection with passenger and other elevators or lifts; and with this and other objects in view the invention consists mainly of a brake or brakes and a governor with certain accessory fittings and mechanisms constructed and combined as hereinafter described and claimed.

The invention is fully disclosed in the following specification, of which the accompanying drawings form a part, in which the separate parts of my improvement are designated by the same reference characters in each of the views, and in which—

Figure 1 is a sectional side elevation showing an elevator-car provided with my improvement and showing vertically-arranged guides, between which the car is mounted; Fig. 2, a plan view of the apparatus as shown in Fig. 1; Fig. 3, a view at right angles to that shown in Fig. 1, and Fig. 4 a detail view of a free wheel which forms part of the mechanism which I employ and a portion of the shaft on which it is mounted.

In the drawings forming part of this specification, I have shown at A an ordinary centrifugal governor, which is mounted upon the bottom $A^2$ of the elevator-car, and this governor is brought into action by the descent of the car or carriage, so that when its speed exceeds a certain limit the brake or brakes B act so as to check or arrest the descent of the car or carriage.

The governor A is a centrifugal governor, which is set in motion by a train of wheels C, D, and E, connected to a roller F, which is pressed against the side of the guide G by means of strong springs H. The wheel E is made in the form of a free wheel, so that when the car or carriage is descending it drives the governor A; but when the car or carriage is ascending the wheel E runs free.

Any suitable means may be provided to enable the wheel E to operate as described; but in Fig. 4 I have shown the shaft J provided with a ratchet $E^2$ and the wheel E provided with a pawl $E^3$ and a spring operating in connection therewith. The pawl operates in connection with the ratchet $E^2$, and by means of this construction it will be apparent that when the wheel E revolves in one direction the shaft J will turn therewith; but when the wheel E revolves in the other direction it will turn free.

The free wheel E is connected to a spindle J, which passes through the bracket K, having a bearing on the outer sides of the bracket K. On the spindle J is a loose sleeve L, which is fitted into the sides of the bracket K, so that the spindle J can revolve freely inside the sleeve L. The two arms or cheeks M are free to revolve around the sleeve L independent of the spindle J, at the same time revolving about the same center.

The roller F revolves between the two arms or cheeks M, being keyed to the wheel C, which gears with D, wheel D gearing into E and wheel E actuating the governor A. Now the roller F revolves as the car or carriage descends, driving the wheel C, wheel C driving wheel D and wheel D driving wheel E, which actuates the governor.

The wheel E is similar to other wheels of this class and is free to turn in one direction, and in the opposite direction it operates as a fixed wheel—that is, when the car or carriage is descending the wheel E is a fixed wheel, and when the car or carriage is ascending the wheel E is free to turn, and in the downward movement of the car or carriage the wheel E drives the governor A; but in the opposite direction the said wheel simply revolves as an idle wheel, and any suitable construction or means may be provided to accomplish this result, such as a pawl and ratchet or any equivalent arrangement.

Having the arms or cheeks M free to revolve on the sleeve L, the arms or cheeks are able to revolve about the same center as the spindle J. Therefore the roller F and also the train of wheels C, D, and E can revolve about the same center as the spindle J, and the roller F being free to revolve or move backward and forward (as the car or carriage is descending and during the time it is driving the governor) will remain pressed hard against the guides G independent of any side movement of the car or carriage.

It will now be seen that the quicker the car or carriage descends the quicker the roller F will revolve, and therefore the governor A, and also the speed of the governor can be regulated to open the valve N at any given speed of the car or carriage. Now the valve N is in direct communication with the brake-cylinder O, and when the valve N is opened fluid or gaseous pressure is released from the side of the cylinder nearest the guide G, and therefore the spiral spring P is released which had previously been compressed between the plunger Q, and the guides forcing the plunger Q in the direction shown by the arrow, thus actuating the two bell-crank levers R and $R^2$, one of the arms of which form the rubbing piece or brake B and forcing these rubbing pieces or brakes against the guides or other stationary parts of the framework to the lift. Fluid or gaseous pressure is pumped into the brake-cylinder O through the inlet T, the inlet T having a back-pressure valve, so that the fluid or gas can be pumped into the cylinder, but cannot escape by the same inlet, the only means of escape being through the outlet U and the valve N.

The bell-crank lever R gets its motion direct from the plunger Q by means of the connecting-rod V; the bell-crank lever $R^2$ gets its motion through the connecting-rod W and the bell-crank lever X.

The rubbing pieces or brakes B are adjusted as to the pressure they can exert on the guide G or other stationary part of the framework of the lift by means of adjustable stops Y, which can be adjusted to allow the brakes or rubbing pieces to exert just sufficient pressure to stop the car or carriage without damaging the guides.

Should it happen when the brakes were put on that the bell-crank lever R traveled farther than the bell-crank lever $R^2$, then as they are connected it would be necessary to have some means to prevent the connecting-rods from bending. To prevent this, I have put in the arrangement Z, so that in forcing the brake off the spring $A^2$ is sufficiently strong; but should undue pressure come in the other direction—that is, when the brakes are on—the spring would be compressed and prevent the connecting-rod from being bent. Again, as the car travels down at a speed in excess of its working speed the rollers F through the train of wheels actuates the governor A, which releases the pressure from the cylinder, allowing the compressed spring to force the plunger Q in the direction of the arrow, and thus forcing the brakes B against the guides or framework.

As the car is traveling at a certain speed and the guides are stationary it will be only necessary to have a spring P sufficiently strong to force the rubbing pieces or brakes B against the guides, as the moment the rubbing pieces or brakes B touch the guides G they will endeavor to cease traveling with the car, and this will continue until they strike the stops Y, which of course will be almost instantaneous.

To release the brakes, the car or carriage will require to be raised and when raised fluid or gaseous pressure to be again pumped into the brake-cylinder to force the plunger in the opposite direction to the arrow, thus drawing the brakes away from the guides and at the same time compressing the spring P, ready for the next time the brake should be required.

Inside the car or carriage a quadrant would be fixed, having a needle or pointer connected to the brakes underneath, indicating on the quadrant the exact position of the brakes with respect to the guides, so that the attendant could tell at any time the exact position of his brakes. A pressure-gage would also be fixed by the side of the quadrant, indicating the pressure in the brake-cylinder.

Having thus fully described my invention, what I claim as new, and desire to secure by Letters Patent, is—

1. In an apparatus of the class described, an elevator or lift, vertical guides at the sides thereof, a spring-operated roller connected with the elevator or lift and bearing on one of said guides, a centrifugal governor operated by the descent of the car and in operative connection with said roller, brakes mounted beneath the car and adapted to bear on said guides, devices for operating said brakes and means whereby the operation of said devices are controlled by said governor, and devices for adjusting the pressure exerted by said brakes on said guides, substantially as shown and described.

2. In a safety-brake mechanism for elevators provided with vertical guides, a shaft revolubly mounted on said elevator, a sleeve loosely mounted on said shaft, arms secured to said sleeve, a roller revolubly mounted in said arms, a spring in operation with said arms and roller, said roller bearing on and being revolved by one of said vertical guides, a gear-wheel in connection with said roller, and operated thereby, a pinion in operation therewith, a gear-wheel mounted on said shaft and in operative connection with said pinion and adapted to turn in one direction only, and a centrifugal governor in operative connection with said shaft, substantially as shown and described.

3. A safety-brake mechanism for elevators provided with vertical guides, said safety mechanism comprising a spring-operated roller connected with said elevator and bearing on one of said guides, a centrifugal governor connected therewith, a valve in operative connection with said governor and adapted to be operated thereby, a cylinder in communication with said valve, a feed-pipe in communication with said cylinder, a plunger movable in said cylinder, a coil-spring in operative connection with said plunger, bell-crank levers, in operation with said plunger, a brake secured to each of said bell-crank levers, and adjacent to said vertical guides and means for forcing the said plunger and integral parts against said coil-spring, substantially as shown and described.

In testimony that I claim the foregoing as my invention I have signed my name, in presence of the subscribing witnesses, this 6th day of May, 1902.

WILLIAM GRAHAM MENZIES.

Witnesses:
R. WESTACOTT,
HARRY FRANKLIN JOYCE.